US010380364B2

(12) United States Patent
Eda et al.

(10) Patent No.: US 10,380,364 B2
(45) Date of Patent: Aug. 13, 2019

(54) UNIFIED FILE AND OBJECT STORAGE ARCHITECTURE FOR CLUSTERED FILE SYSTEMS

(71) Applicant: International Business Machines Corporation, Armonk, NY (US)

(72) Inventors: Sasikanth Eda, Pune (IN); Dean Hildebrand, Bellingham, WA (US); Ashutosh V. Mate, Pune (IN); Varun Mittal, Zirakpur (IN); William W. Owen, Tucson, AZ (US); Sandeep R. Patil, Pune (IN); Smita J. Raut, Pune (IN)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 15/085,367

(22) Filed: Mar. 30, 2016

(65) Prior Publication Data

US 2017/0286707 A1 Oct. 5, 2017

(51) Int. Cl.
*G06F 16/13* (2019.01)
*G06F 21/62* (2013.01)
*G06F 16/182* (2019.01)
*H04L 29/06* (2006.01)

(52) U.S. Cl.
CPC .......... *G06F 21/6218* (2013.01); *G06F 16/13* (2019.01); *G06F 16/1827* (2019.01); *H04L 63/101* (2013.01); *H04L 63/205* (2013.01)

(58) Field of Classification Search
CPC .. G06F 21/6218; G06F 16/1827; G06F 16/13; H04L 63/101; H04L 63/205
USPC .......................................................... 707/785
See application file for complete search history.

(56) References Cited

U.S. PATENT DOCUMENTS

| 5,778,222 A  * | 7/1998 | Herrick ............... G06F 21/6218 707/702 |
| 8,478,799 B2 * | 7/2013 | Beaverson ........ G06F 17/30097 707/823 |
| 8,719,913 B2 * | 5/2014 | Ling ..................... G06F 21/604 709/223 |
| 8,849,759 B2 | 9/2014 | Bestler et al. |

(Continued)

OTHER PUBLICATIONS

Hildebrand et al., "OpenStack SwiftOnFile: User Identity for Cross Protocol Access Demystified," 29 pgs., 2015 Storage Developer Conference, SNIA, Santa Clara, 2015, © IBM.

(Continued)

*Primary Examiner* — Robert W Beausoliel, Jr.
*Assistant Examiner* — Arthur Ganger
(74) *Attorney, Agent, or Firm* — Robert J. Shatto

(57) ABSTRACT

A processor may identify a first directory in the UFO storage system. The first directory may include one or more subdirectories in one or more levels under the first directory. The one or more subdirectories may include a second directory that has includes one or more objects. The first directory may be associated with a first inode, and the second directory may be associated with a second inode. The processor may perform a stat call on the second directory to determine metadata attributes for the one or more objects that are stored in the second directory. The metadata attributes for the one or more objects may be stored in the second inode. The processor may add the metadata attributes for the one or more objects to the first inode.

25 Claims, 11 Drawing Sheets

(56) References Cited

U.S. PATENT DOCUMENTS

| | | | | |
|---|---|---|---|---|
| 8,903,761 | B1* | 12/2014 | Zayas | H04L 67/1097 707/602 |
| 2007/0185934 | A1* | 8/2007 | Cannon | G06F 11/1469 |
| 2011/0119732 | A1* | 5/2011 | Dunn | H04L 63/102 726/1 |
| 2011/0137966 | A1 | 6/2011 | Srinivasan et al. | |
| 2012/0330894 | A1 | 12/2012 | Slik | |
| 2014/0025713 | A1 | 1/2014 | Avati et al. | |
| 2015/0269203 | A1* | 9/2015 | Baldwin | G06F 17/30321 707/741 |

OTHER PUBLICATIONS

IBM, "IBM Spectrum Scale Version 4 Release 2.0," Concepts, Planning and Installation Guide, GA76-0441-05, 242 pgs., https://www.ibm.com/support/knowledgecenter/api/content/nl/en-us/STXKQY_4.2.0/a7604415.pdf, © IBM Corporation 2014, 2016.

Kumar, "SWIFT without Database Challenges and Resolution," 2015 OpenStack Summit Tokyo, Oct. 28, 2015, 3 pages, printed on Jan. 11, 2016, https://www.youtube.com/watch?v=0gZuyhVQMYs.

Thiagodasilva, "Icehouse release—version 1.13.1-2," GitHub Inc., Version 1.13.1-2, 1 page, printed on Jan. 8, 2016, Copyright 2016 GitHub, Inc., https://github.com/swiftonfile/swiftonfile/releases/tag/v1.13.1-2.

Unknown, "OpenStack Swift Overview," OpenStack Swift, 20 pages, printed on Jan. 8, 2016 https://swiftstack.com/openstack-swift/.

Unknown, "Swift Architectural Overview," OpenStack, 2.5.1.dev242 documentation, 3 pages, printed on Jan. 8, 2016, http://docs.openstack.org/developer/swift/overview_architecture.html.

Unknown, "Swift-on-File," OpenStack, GitHub Inc., 2 pages, printed on Jan. 8, 2016, Copyright 2016 GitHub, Inc https://github.com/openstack/swiftonfile/blob/master/README.md.

* cited by examiner

800

START

↓

Generate access control list (ACL) rule(s) for an object in a directory
802

↓

Receive a notification that a user has changed the ACL rule for the object
804

↓

ACL rules different?
806 —N→

↓Y

Prompt user to approve ACL change
808

↓

User approve change?
812 —N→

↓Y

Change ACL rule(s) for object
814

↓

Update extended inodes for directory and parent directories
816

↓

END

FIG. 8

UNIFIED FILE AND OBJECT STORAGE ARCHITECTURE FOR CLUSTERED FILE SYSTEMS

BACKGROUND

The present disclosure relates generally to the field of computer storage, and more particularly to a unified file and object storage architecture for clustered file systems.

The current day implementation of object storage (both traditional commodity built as well as clustered file system built) requires databases as a physical representation for containers and accounts. The databases are used for storing metadata, such as account name, container names, access control lists (ACLs), storage policies, bytes used, object names, size, entity tags (ETags), content-length, etc. This kind of implementation results in numerous problems (from object usage only, as well as from unified file and object usage).

Scalability: Object storage systems are meant for high scalability and supposed to support an infinite number of objects. However, the container and account databases (e.g., SQLite databases) grow in size as the number of containers and objects increase. This growth in size results in longer time to update or retrieve an entry from the database (as database operations happen sequentially), and also adds to the database performance overheads, negatively impacting the overall object storage system performance and potentially limiting the scalability of the object storage system.

Unpredictable response times of metadata update and/or retrieval during load conditions: At scale, object storage systems give unpredictable response times for object retrieval as well as for metadata updates. This problem is currently addressed by placing container databases on faster solid state drives (SSDs), rather than on hard disk drives (HDDs). But, in the scenario of a unified file and object (UFO) system, this behavior creates a serious concern as file workloads expect instantaneous updates and a definitive, uniform behavior.

Replication of databases across multiple sites: In a multi-site cluster, replication of database files requires a significant amount of time. The database files may need to be replicated for consistency, error recovery (e.g., in case a database file is corrupted), etc. In this kind of setup, it frequently occurs that the listings in a database (e.g., at the account and/or container level) are inaccurate due to pending queued database updates.

Objects generated via file interface: The UFO specification allows users to access and modify data as objects using a representational state transfer (REST) interface, along with the ability to access and modify files from network-attached storage (NAS) interfaces, including network file system (NFS) and server message block (SMB) interfaces. However, the current day object storage architectures lack the framework to automatically update the object interface databases (e.g., container and/or account databases) with objects created via file interfaces, such as NFS, SMB, and portable operating system interface (POSIX) interfaces.

Automatic Object metadata creation and/or updating for objects created via file interface: The present day object storage architecture lacks the framework to automatically create and/or append metadata for a file created via a file interface, which helps it to be accessed via an object interface (e.g., helps follow the object semantics).

Access control list (ACL) compatibility: The object ACLs form a subset of File ACLs. Currently, in the UFO architecture, there exists no functionality that helps maintain compatibility between Object and File ACLs, and there exists no notification mechanism related to ACL changes.

SUMMARY

Embodiments of the present invention disclose a method, computer program product, and system for generating an extended inode space for unified file and object (UFO) storage systems. A processor may identify a first directory in the UFO storage system. The first directory may include one or more subdirectories in one or more levels under the first directory. The one or more subdirectories may include a second directory that has includes one or more objects. The first directory may be associated with a first inode, and the second directory may be associated with a second inode. The processor may perform a stat call on the second directory to determine metadata attributes for the one or more objects that are stored in the second directory. The metadata attributes for the one or more objects may be stored in the second inode. The processor may add the metadata attributes for the one or more objects to the first inode.

In some optional embodiments of the present disclosure, the processor may identify one or more metadata parameters for objects in the UFO storage system. The UFO storage system may have a UFO namespace where data can be accessed as an object and as a file. The metadata parameters may be parameters that are generated for objects stored in the UFO storage system. The processor may determine that a second object has been updated using a file storage interface. The processor may generate metadata for the second object. The generated metadata may include values for the second object that correspond to the one or more metadata parameters. The processor may add the generated metadata to the second object.

In some optional embodiments of the present disclosure, the processor may determine that a first object that is stored in the second directory has been modified. The processor may determine updated metadata attributes for the first object. The processor may update the second inode with the updated metadata attributes. The processor may also pass the updated metadata attributes for the first object to the first directory, and update the metadata attributes for the first object in the first inode.

In some optional embodiments, the processor may determine that a user has modified an access control list setting for a second object that is stored in a third directory. The processor may compare the modified access control list setting for the second object to a container access control list setting for a first container by analyzing an inode associated with the third directory. The first container may include the second object. The processor may determine whether the modified access control list setting for the second object matches the container access control list setting. If they do not match, the processor may notify the user that there is a mismatch and prompt the user to approved the modified access control list setting for the second object. The processor may update the inode associated with the third directory if the user approves the modified access control list setting.

Thus, various embodiments of the present disclosure advantageously provide a framework for a UFO storage system in which data may be access as an object and as a file. By storing the metadata attributes for the one or more objects in the first inode, the computer system may eliminate the need for container and account databases in the UFO storage system. Optional embodiments may ensure that objects include their object-store specific metadata, even if they are updated using a file storage interface. Optional embodiments may also ensure that inodes for higher level directories are automatically updated whenever an object in a lower level directory is updated. Finally, some embodiments may automatically maintain file and object ACL compatibility for the UFO storage system.

The above summary is not intended to describe each illustrated embodiment or every implementation of the present disclosure. The aforementioned advantages represent example advantages, and therefore, not all advantages of the various embodiments are described herein. Furthermore, some embodiments of the present disclosure can exhibit none, some, or all of the advantages listed herein while remaining within the spirit and scope of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 8 illustrates a flowchart of an example method for managing access control list (ACL) rules for a UFO storage system using extended directory inodes, in accordance with embodiments of the present disclosure.

Figure 1:
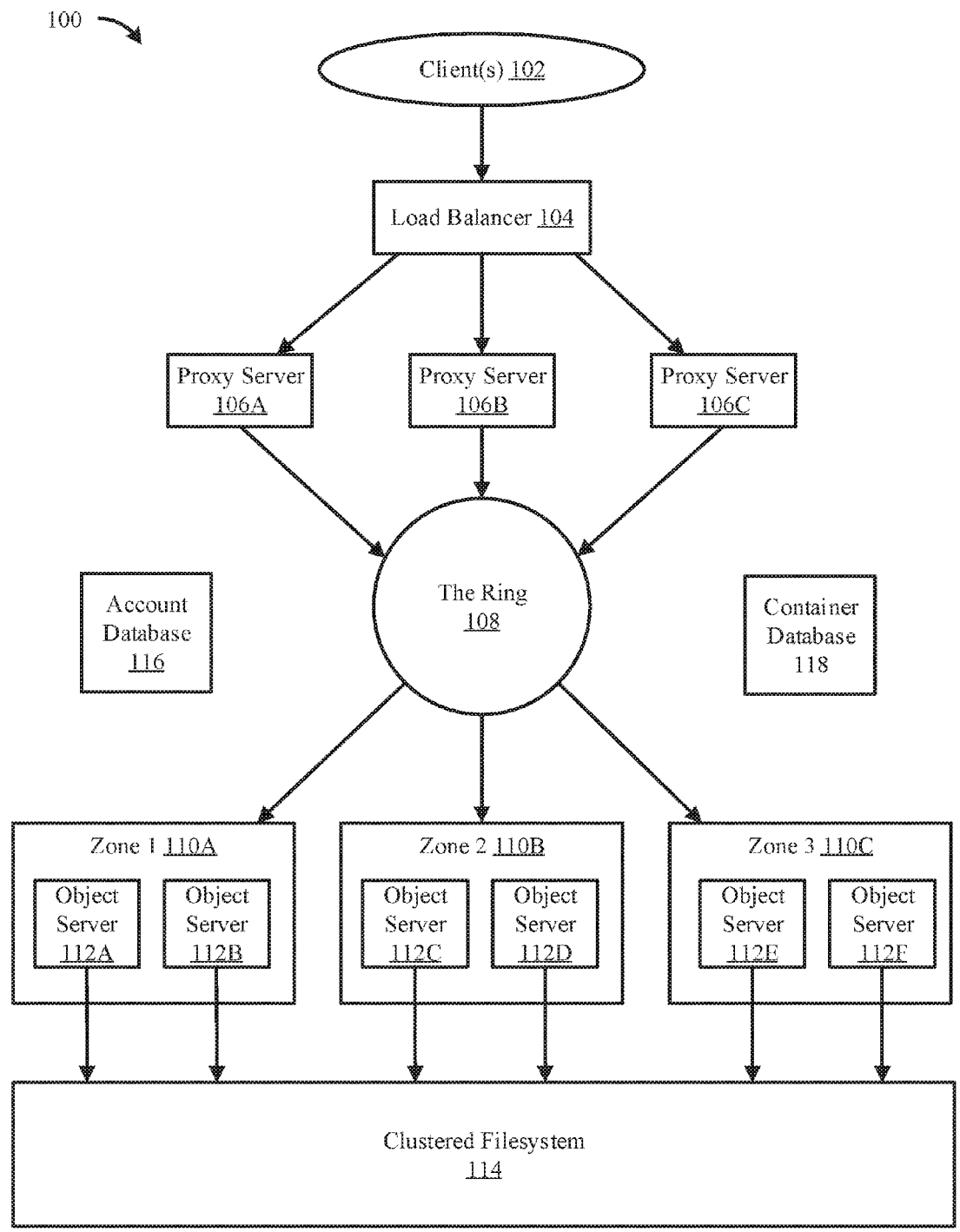
FIG. 1 illustrates an example object storage environment using a clustered file system in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer storage, and in particular to a unified file and object storage architecture for clustered file systems. While the present disclosure is not necessarily limited to such applications, various aspects of the disclosure may be appreciated through a discussion of various examples using this context.

Unified File and Object (UFO) Storage unifies network-attached storage (NAS) and object storage technologies. It provides a system for data storage that enables users to access the same data as an object and as a file, thus simplifying management and controlling storage costs. It allows users to access and modify data as objects from a representational state transfer (REST) interface, while also allowing users to access and modify the same data as files using NAS interfaces including network file system (NFS), server message block (SMB), and portable operating system interface (POSIX) interfaces.

In some embodiments, the UFO storage system may store objects and files using a file hierarchy that includes directories and subdirectories, as with traditional file system storage. Each directory may correspond to an object's account or container. The UFO storage system may have a tree structure with one or more branches. The tree structure may include one or more levels. The top-level may be referred to as the root level, and may store the root directory for the UFO storage system, while the bottom level may be referred to as the leaf level, and it may include the leaf nodes (also called end-nodes or leaves). Directories that are not leaf directories (e.g., they have at least one nested child subdirectory) and are not root directories (e.g., they have a parent directory) may be referred to as intermediate directories. Each branch may be a specific path from the root directory to a leaf directory, and may include one or more intermediate directories.

As used herein, a "file" may be a resource (e.g., a container) for storing data in a computer system that is generated using a file interface. In some embodiments, a file may be organized into one-dimensional arrays of bytes, and the file's format may be defined by its content, and may be indicated using a filename extension. Generally, though not always, a file will include fixed metadata attributes (e.g., filename, creation date, type).

An "object," as used herein, may be a resource for storing data in a computer system that is generated using an object interface (e.g., REST). Unlike files, objects often, though not always, include additional metadata attributes. These metadata attributes may be customizable by users or according to the needs of the object store. Because a UFO storage system allows data to be manipulated as both an object and as a file, object and file are used interchangeably throughout this disclosure to refer to a container for data, except when explicitly stated or made clear by the context.

As used herein, an "inode" is a data structure that stores metadata attributes for a file system object (e.g., an object, file, or directory). For example, an inode may be a table that has one or more columns and one or more rows. Each column may correspond to a specific metadata parameter (e.g., object size), and each row may correspond to a specific entry or record in the inode (e.g., to a specific file or object).

While inodes generally refer to the data structure used by UNIX® operating systems to store metadata, other operating systems may have functional equivalents (UNIX is a registered trademark owned by X/OPEN COMPANY LIMITED CORPORATION, UNITED KINGDOM THAMES TOWER, 37-45 STATION ROAD READING, BERKSHIRE RG1 1LX UNITED KINGDOM). Accordingly, the present disclosure should not be limited to UNIX® operating systems. Metadata attributes saved in an inode may include, but are not limited to, directory name, object names, creation times for objects, size, ETag, manipulation metadata (e.g., last access time, last modified time, change time), and owner and permission data (e.g., ACLs, group-id, user-id). Each inode may additionally include disk block location(s) of the file system object's data.

As used herein, a "stat call" refers to a system call that returns file attributes about an inode. The file attributes may include metadata (e.g., creation time, ETag, object size) for one or more objects in the directory on which the stat call was performed. The returned file attributes are referred to as "stat details" herein. While stat calls generally refer to a particular system calls in UNIX® operating systems, other operating systems may have functional equivalents. Accordingly, the present disclosure should not be limited to a UNIX® operating system.

Embodiments of the present disclosure include a framework for a UFO storage system that can be integrated into a clustered file system architecture. In some embodiments, the UFO storage system disclosed herein may eliminate the need for databases and/or flat files to store metadata for objects, containers, and accounts. The UFO architecture involves the generation of extended directory inode spaces (also referred to herein as extended inodes) for all directories in the UFO storage system.

Current POSIX file systems limit their "stat" capability (e.g., their metadata identification capability) to the parent layer (e.g., top most layer on which the stat call has been executed), and fails to collect "stat" details from child layers. For example, consider a file system layout with "/topDir/uFile1" and "/topDir/childDir/cFile1." If a stat call is performed on the "topDir," it will only retrieve the details of the parent layer (e.g., it will list the details of "uFile1"), and it will not include a listing of details for objects or files in the child directory (e.g., "cFile1").

In some embodiments, a computer system may use a new application programming interface (API) call to perform a recursive stat (e.g., bottom-up) operation to generate the complete detail listing for a directory (even from inner directory layers). Using the proposed API call, the computer system performs a local stat call at each lower directory (e.g., starting with the leaf directories) to retrieve stat details found in the lower directory's extended directory inode. The computer system then passes the stat details of the lower directories to the upper (e.g., parent) directory layer. At the parent directory layer, details of one or more child directories are accumulated in the extended directory inode for the parent directory. If the parent directory is not the top-level (e.g., root) directory, the stat details of the parent directory and its children are passed to the next upper directory layer. The computer system continues to recursively populate extended directory inodes for each directory in the UFO storage system with the stat details of all child directories until it reaches the object store layer (e.g., the topmost layer). By storing the stat details of all of the objects and files in the topmost directory's extended directory inode, the computer system may remove the need for databases or flat file structures. However, in some embodiments, the stat details can be dumped into a flat file structure which is optimized for random access. Likewise, the stat details may be dumped into a database for archival purposes, or to make the UFO storage system compatible with other storage systems that use databases to store metadata.

In some embodiments, the computer system may use file system event notification mechanisms (e.g., Data Management API, general parallel file system (GPFS) Light Weight Events, inotify, etc.) to identify files generated, modified, and/or deleted via object or file interfaces. Based on the type of event (e.g., CREATE, DELETE, MODIFY), the computer system may update details stored in the respective extended directory inodes (e.g., the extended directory inode for the directory that stores the updated object or file). The computer system may also update the extended directory inodes for all parent directories in the recursive fashion discussed herein. In some embodiments, the computer system may also update listings that have been dumped into a database or flat file structure.

Additionally, in some embodiments, the computer system may enable usage of the event notifications by other external APIs. For example, the generated events can be further published to cloud messaging services or cloud gateways. The cloud messaging services or cloud gateways may use these events to derive workload patterns or trigger analytic operations, for example. As another example, the external APIs for an email server may use the event notifications to automatically email a user (e.g., an administrator) whenever an event has occurred.

As yet another example, some file systems and/or backends may not have inherent capability to publish event notifications to an application layer. In these embodiments, the file systems or backends may rely on external applications or middleware (e.g., configured at the application layer). The middleware may hook to the I/O path and, based on the I/O mode (e.g., open, closed, etc.), publish the notifications from a user space rather than from the kernel space.

In current object storage systems, any object that gets stored in an object store will be appended with object-store specific system metadata attributes, such as Content-Length, size, creation time, ETag, and/or other custom metadata details. This metadata is in turn used by the object store internally to determine whether the data has been corrupted, to perform a health check, etc. However, if a UFO system is built based on this architecture, objects generated via a file interface will not include this metadata.

In some embodiments, the UFO storage system disclosed herein automatically generates the object-store specific metadata by default (e.g., after the file CLOSE call) for any object that gets generated via a file interface (e.g., NFS, SMB, POSIX). The UFO storage system may use file system event notification APIs (e.g., Data Management API, GPFS Light Weight Events, inotify, etc.) to determine whether a file or object has been updated using a file interface and needs metadata creation. For example, if the object is updated with using an NFS interface, the UFO storage system may receive the "FILE UPDATE" notification from the file system event notification API. In response to receiving the "FILE UPDATE" notification, the UFO storage system may generate the object-store specific metadata associated with the object (e.g., ETag, size, Content-Length) and append the updated metadata to the object. The computer system may then recursively update the extended directory inodes for all parent directories above the object (e.g., all upbranch directories). In some embodiments, the metadata parameters may be user-configurable (e.g., during the UFO namespace creation) according on the type of metadata fields needed by the object store.

In some embodiments, the UFO storage system may use an Information Lifecycle management (ILM) policy engine to determine whether a directory or object needs to be migrated to another storage location. A clustered file system may use different hardware to store different files. For example, the file system may have a pool of HDDs and a pool of solid state drives (SSDs). The ILM policy engine may identify migration candidates based on the details stored in the extended directory inode spaces. For example, assume that an end user deploys a rule which states "migrate all containers with size >500 GB to SSD pool and size <500 GB to HDD pool." In this scenario, the ILM policy engine may scan through the details (e.g., size) stored in each extended directory inode space and decide which directories need to be moved to an SSD pool and/or to a HDD pool. This is in contrast to traditional ILM policy engines, which must scan the entire file system and/or namespace (e.g., all entries stored on the file system) to determine which entries need to be migrated. Scanning through the extended directory inode may be significantly quicker and less resource intensive than performing a scan of the entire file system and/or namespace.

In some embodiments, the computer system may use the extended directory inodes to manage ACL settings (also called ACL rules) for objects in the UFO storage system. The computer system may first assign the object an ACL setting. The initial ACL setting may be object specific (e.g., determined for each object on an object-by-object basis) or it may be based on the ACL setting of the container that includes the object. This may be done using the object interface and the extended directory inodes (e.g., by scanning or analyzing the extended directory inode for the container). If the end user tries to set a new ACL setting for the object, the computer system may receive a file system ACL change API request. The computer system may then compare the current object (or container) ACL setting, which is stored in the extended directory inode, with the newly received ACL setting. If they are different, the computer system may alert the user with a warning or other notification related to the change in ACL settings. The notification may prompt the user to decide whether he approves the change in the ACL settings for the object. If the user approves the new ACL setting, the computer system may replace the old ACL stored in the directory inode. The computer system may then update inodes for the upper hierarchies (e.g., to the object layer).

Referring now to FIG. 1, shown is an example object storage environment 100 for a UFO storage system that uses a clustered file system in which illustrative embodiments of the present disclosure may be implemented. The object storage environment 100 may include one or more clients (e.g., computer systems) 102 that are permitted to access data stored in the UFO storage system. The clients 102 may send requests (e.g., to retrieve data, update data, store data, etc.) to a load balancer 104, which may be responsible for routing the request through one or more proxy servers 106A-C. The proxy servers 106A-C may be computer systems that perform distributed load handling and request handling for the UFO storage system. The proxy servers 106A-C may pass the requests to the ring 108.

The ring 108 may be a data structure that is responsible for determining where data should reside in a cluster. For example, the ring 108 may route the data storage requests to different zones (e.g., Zones 1 through 3 110A-C in FIG. 1) so that different object servers (e.g., object servers 112A-F) handle the requests. The ring 108 may also be responsible for ensuring that objects are redundantly stored in different zones or regions. This may help ensure that data is protected against location specific outages, and to ensure that backups of all of the objects are kept. Finally, the ring 108 may be responsible for mapping an object name to its storage location.

The object servers 112A-F may be computer systems that perform the actual reading/writing of objects from/to the physical hardware (e.g., to HDDs). In a clustered UFO storage system, the object servers 112A-F may all write to, and read from, hardware (e.g., SSDs or HDDs) that use a single clustered file system 114 with a single UFO namespace. In some embodiments, the object servers 112A-F may be responsible for writing to and reading from a cluster that includes multiple file systems or filesets. These file systems may use different architectures (e.g., the single cluster may have a traditional file system and a UFO file system), or they may use the same file system (e.g., the cluster may have two or more separate UFO file systems).

The object storage environment 100 may also include an account database 116 and a container database 118. The account database 116 may store metadata attributes for one or more accounts. Each account may include one or more containers. The container database 118 may store metadata attributes for one or more containers, each of which may include one or more objects. Due to the merging of file system storage and object storage, in current UFO storage systems, the account and container databases 116 and 118 may be maintained in addition to inodes, which store metadata information for file system object. As discussed herein, embodiments of the present disclosure may not need the account and container databases. Accordingly, in some embodiments, the UFO storage system may not include the account database 116 or the container database 118.

Although not shown in FIG. 1, the various systems in the object storage environment 100 may communicate with each other over one or more networks. For example, the clients 102 may communicate with the load balancer 104 over a network. Likewise, the load balancer 104 may communicate with the proxy servers 106A-C over a network, and the proxy servers 106A-C may communicate with the ring 108 over a network. In some embodiments, the various networks can be implemented using any number of any suitable communications media. For example, the network may be a wide area network (WAN), a local area network (LAN), an internet, or an intranet.

In certain embodiments, the various systems may be local to each other, and communicate via any appropriate local communication medium. For example, the proxy servers 106A-C may communicate with the ring 108 using a local area network (LAN), one or more hardwire connections, a wireless link or router, or an intranet. In some embodiments, the various systems may be communicatively coupled using a combination of one or more networks and/or one or more local connections. For example, a proxy servers 106A-C may be hardwired (e.g., connected with an Ethernet cable) to the ring 108, either directly or indirectly, while the clients 102 may communicate with the proxy servers 106A-C using a wireless network (e.g., over the Internet).

Figure 2:
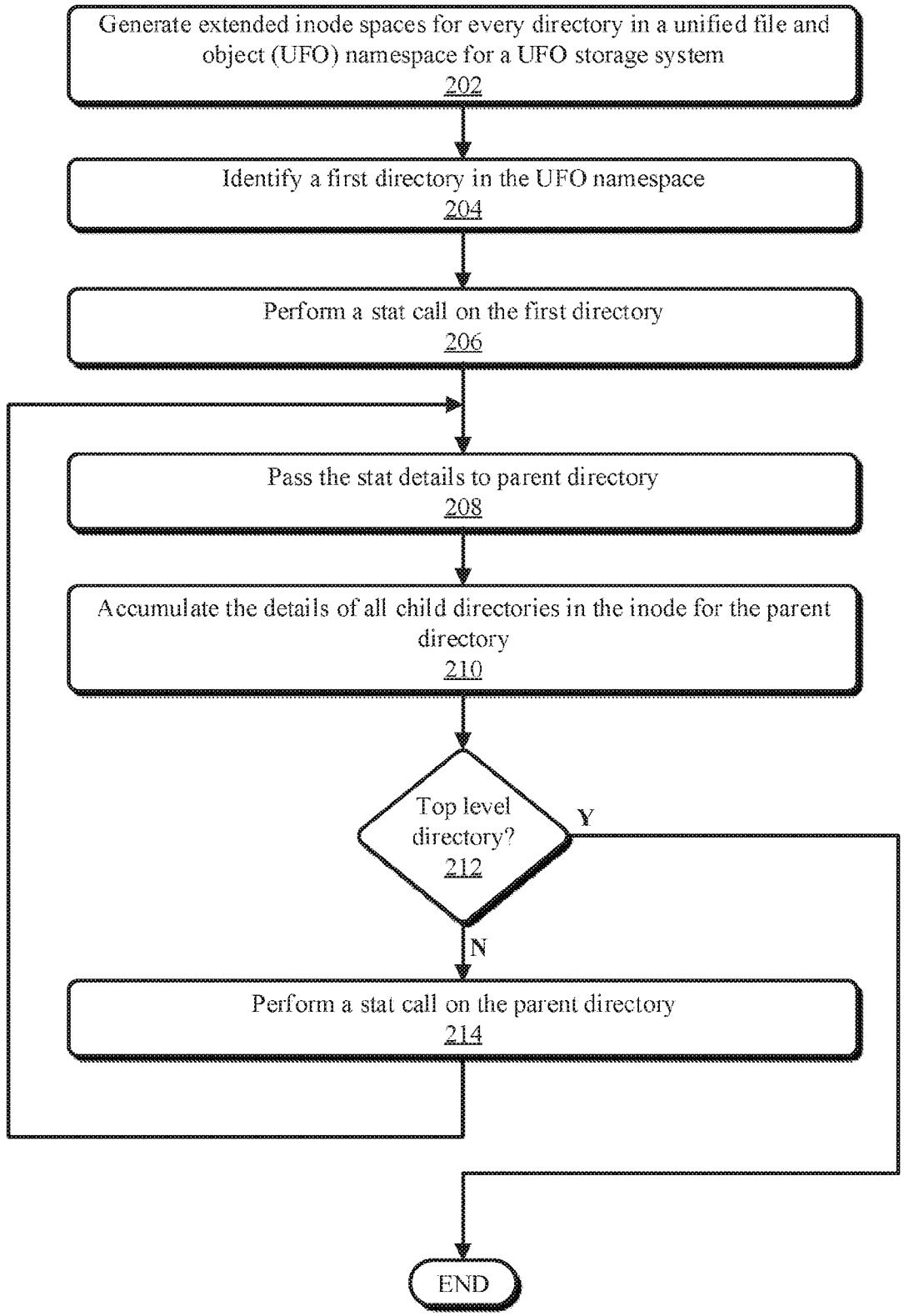
FIG. 2 illustrates a flowchart of an example method for generating and populating extended inode spaces for directories using a recursive stat call, in accordance with embodiments of the present disclosure.

Referring now to FIG. 2, shown is a flowchart of an example method 200 for generating and populating extended inode spaces for directories using a recursive stat call, in accordance with embodiments of the present disclosure. The method 200 may be performed by a computer system (e.g., an object server or storage server). In some embodiments, one or more operations of the method 200 may be performed by a user, or by the computer system in response to user input. The method 200 may begin at operation 202, where the computer system may generate extended inode spaces for every directory in a UFO namespace.

In some embodiments, the computer system may generate a set of extended inodes (e.g., data structures) to store metadata about the objects and/or files located in the UFO file system. Each inode may have an associated directory in the UFO file system. Each inode may have an integer number, also known as an i-number or inode number, that identifies the particular inode. The computer system may generate an index table (or inode table) that uses the integer numbers of the inodes to index them so that a file system driver portion of an operating system kernel can access the contents of the inodes, including the location of the underlying data (e.g., the file or object) on a physical hardware device (e.g., HDD or SSD). Each extended inode may be initially allocated a certain amount of storage space (e.g., have a default size). If necessary, the extended inode space may be dynamically adjusted as the number of objects cataloged by the inode increases.

After generating the extended inodes at operation 202, the computer system may identify a first directory in the UFO namespace at operation 204. The first directory may not be a root directory (e.g., the first directory may have a parent directory). In some embodiments, the first directory may be a leaf directory (e.g., a directory that does not include any subdirectories). The computer system may start with leaf directories as part of a recursive operation to populate extended inodes from the bottom level towards the top. This may allow the extended inodes to be generated with the fewest number of stat calls because each directory will only have a stat call performed once.

For example, a UFO namespace may include three directories. The first directory may be a root directory, the second directory may be nested within the first directory, and the third directory may be nested within the second directory. If the computer system populates the extended inodes from the top-level to the bottom level, the third directory will have a stat call performed twice; once when populating the extended inode for the first directory and once when populating the extended inode for the second directory. However, if the computer system starts with leaf directories (e.g., from the bottom), the third directory will only have a stat call performed once: when populating the inode for the second directory. The inode for the first directory will then be populated by performing a stat call on the inode for the second directory.

After identifying the first directory at operation 204, the computer system may perform a stat call on the first directory at operation 206. The computer system may use the stat call to retrieve metadata attributes (also referred to herein as stat details) for one or more objects stored in the first directory. The stat call may retrieve the stat details from an inode that is associated with the first directory. The stat details may include all of the metadata information that is stored in the inode associated with the first directory. For example, the stat details may include information such as creation time and size for all objects and files stored in the first directory.

In some embodiments, the stat call may retrieve all information that is stored in the inode for the first directory, and not just the metadata attributes for objects nested within the first directory. This may include metadata attributes associated with objects that are stored in a subdirectory of the first directory. In other words, the first directory may be a parent directory for a child directory, and the child directory may include one or more objects. The extended inode for the first directory may include metadata attributes for the one or more objects stored in the child directory. Accordingly, a stat call of the first directory may return the stat details of the one or more objects from the child directory.

After performing a stat call on the first directory at operation 206, the computer system may pass the retrieved stat details to the first directory's parent directory (e.g., to a second directory). As used herein, passing information to a parent directory means making the information available such that the computer system is able to add the information to the inode for the parent directory. In some embodiments, passing information to a parent directory may include moving the information to memory (e.g., loading it in to DRAM or cache) so that it can be written to the parent directory's inode.

In embodiments where the directories are stored on physical drives in different geographic locations, passing the information may mean transmitting the information from one object server to another object server. The metadata information may be passed over a network. In some embodiments, the network can be implemented using any number of any suitable communications media. For example, the network may be a wide area network (WAN), a local area network (LAN), an internet, or an intranet. In certain embodiments, the object servers may be local to each other, and communicate via any appropriate local communication medium. For example, the object servers may communicate using a local area network (LAN), one or more hardwire connections, a wireless link or router, or an intranet. In some embodiments, the object servers may be communicatively coupled using a combination of one or more networks and/or one or more local connections. For example, a first object server may be hardwired (e.g., connected with an Ethernet cable) to a second object server, either directly or indirectly, while a third object server may communicate with the first object server using the network (e.g., over the Internet).

After passing the stat details to the parent directory at operation 208, the computer system may accumulate the stat details for all child directories in the parent directory's extended inode at operation 210. In some embodiments, the parent directory may have more than one child directory. The computer system may perform a stat call for each child directory at operation 206, and then pass the information retrieved from each stat call to the parent directory at operation 208. The computer system may then add the stat details for each object in the child directories to the extended inode for the parent directory at operation 210.

After accumulating the stat details for all child directories in the parent directory's extended inode at operation 210, the computer system may determine whether the parent directory is a top-level (e.g., root) directory at decision block 212. If the computer system determines that the parent directory is a top-level directory at decision block 212, the method 200 may end. If, however, the computer system determines that the parent directory is not a top-level directory at decision block 212, the computer system may perform a stat call on the parent directory at operation 214. As discussed herein, the computer system may use the stat call to retrieve stat details for all objects located in the parent directory and in all lower level directories. For example, the stat call of the parent directory may include information about objects stored in the first directory, the stat details of said objects having been added to the inode for the parent directory at operation 210.

After performing a stat call of the parent directory at operation 214, the method may return to operation 208, where the stat details retrieved at operation 214 may be passed to the next higher directory. Operations 208 through 214 may be repeated until the stat details for all directories reach the root directory, at which point the method 200 may end.

Figure 3:
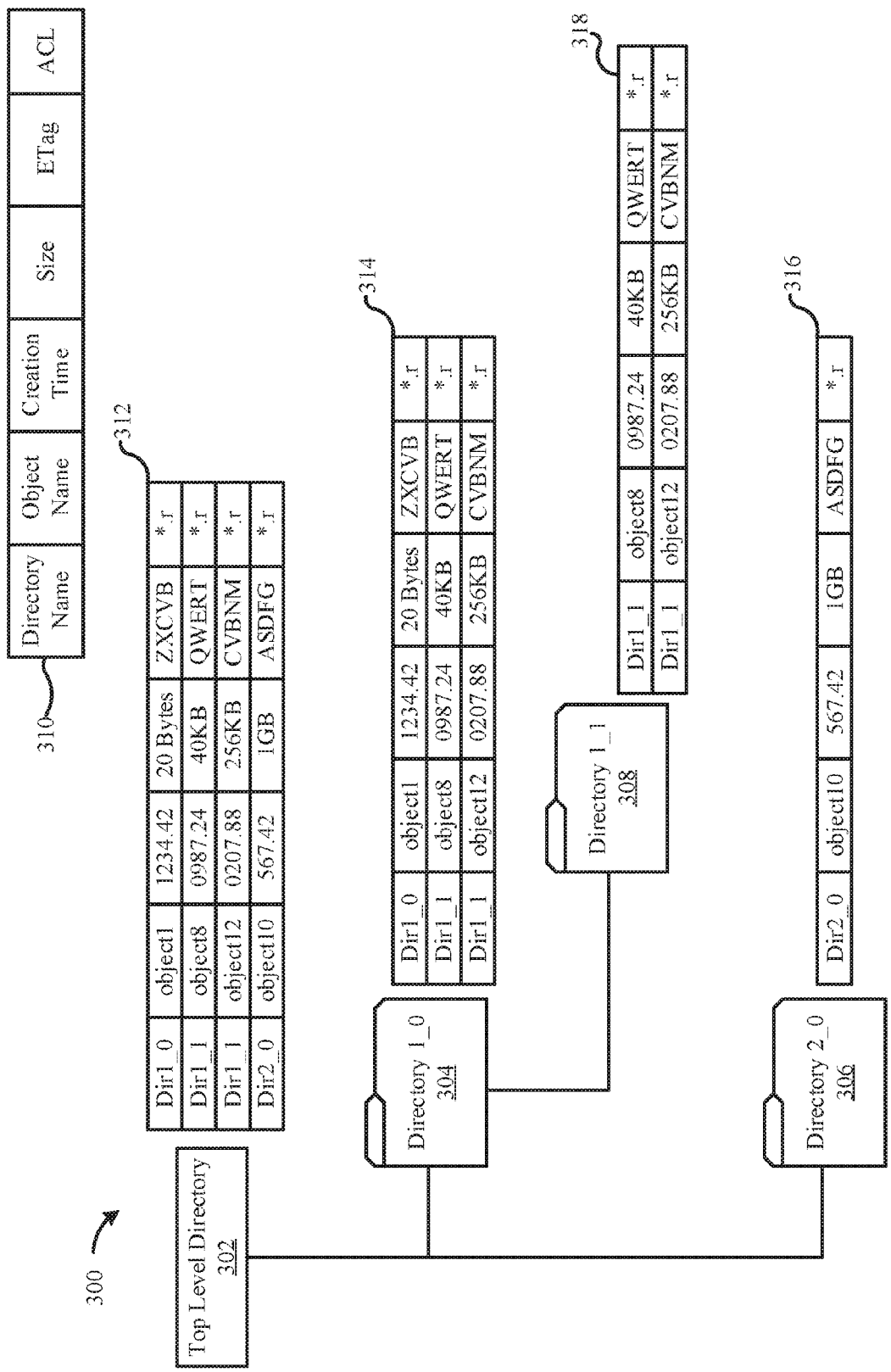
FIG. 3 illustrates an example of an extended directory inode for a top-level directory, in accordance with embodiments of the present disclosure.

Referring now to FIG. 3, shown is an example of a UFO file system 300 with extended directory inodes for each directory in the file system 300, in accordance with embodiments of the present disclosure. The UFO file system 300 has three levels of directories. The top-level, also known as the root level, includes the top-level directory 302, also known as the root directory. The first directory 304 and the second directory 306 are second level directories, and they are child directories (e.g., subdirectories nested within a parent directory) of the root directory 302. The first and second directories 304 and 306 may correspond to a specific object-store account or container. For example, the first directory 304 may correspond to a first account, and the second directory 306 may correspond to a first container. The third directory 308 is a child directory of the first directory 304 and is a third level directory. The third directory 308 may also correspond to an account or a container (e.g., to a second container). Accordingly, the root directory 302 is a parent directory of the first and second directories 304 and 306, and the first directory 304 is a parent directory of the third directory 308.

The UFO file system 300 has two branches. A branch, as used herein, may be a path from a root directory to a leaf directory and includes all directories in the path. A leaf directory may be a directory that does not include any subdirectories. The first branch follows the path from the root directory 302 to the third directory 308. The second branch follows the path from the root directory 302 to the second directory 306. Because the second and third directories 306 and 308 do not contain any subdirectories, they are considered leaf directories.

A first directory is said to be upbranch of a second directory if both directories are in the same branch, and the first directory is at a higher level (e.g., closer to the root directory) than the second directory. Likewise, the second directory is considered to be a downbranch directory of the first directory (or simply downbranch from the first directory). For example, the first directory 304 is considered to be an upbranch directory of the third directory 308. As used herein, information being passed to "parent directories" or to "upper level directories" may mean that the information is passed to all upbranch directories (e.g., up the branch towards the root directory 302).

Each directory in the file system 300 may have an extended directory inode that stores metadata attributes about one or more objects stored in each directory, as discussed herein. In some embodiments, the metadata attributes stored in extended directory inodes may include object-store specific metadata attributes. As discussed herein, object-store specific metadata attributes may be user configurable and may, in some embodiments, be based on the needs of the object store. In some embodiments, the object-store specific metadata attributes may be automatically created by a computer system in response to a file being modified/created/deleted using a file interface.

Each directory 302-308 in FIG. 3 may have an associated extended directory inode. The root directory 302 may be associated with the root inode 312; the first directory 304 may be associated with the first inode 314; the second directory 306 may be associated with the second inode 316; and the third directory 308 may be associated with the third inode 318. Each inode 312-318 in FIG. 3 uses the same schema, as shown by the legend 310.

In some embodiments of the present disclosure, the extended directory inodes 312-318 may include metadata attributes and disk block locations for objects stored in subdirectories (e.g., child directories and other downbranch directories, such as any grand-child directories) as well as for object stored in the directory associated with the inode. This is in contrast to traditional inodes, which may store only metadata associated with the objects nested directly in the particular directory that is associated with the inode.

For example, the third directory 308 (which is a leaf directory) has two objects: object8 and object12. Accordingly, the third inode 318 includes records (or entries) for both object8 and object12. Meanwhile, the first directory 304, which is the parent directory for the third directory 308, includes one object: object1. Because the first inode 314 is an extended directory inode, it may include records for each object stored in the first directory 304 (namely, object1), as well as for objects stored in child and other downbranch directories, which may include object8 and object12.

In some embodiments, a computer system may generate the extended directory inodes 312-318 using a recursive stat call. The computer system may identify bottom level (e.g., leaf) directories. The computer system may then perform a local stat call of the bottom level directories to retrieve the stat details stored in their inodes. The computer system may then pass the metadata attributes for objects in the bottom level directories to parent directories. The computer system may then add the metadata attributes for objects in the child directories to the inode for the parent directories. In other words, the computer system may generate new records or entries in the inodes for the parent directories. The computer system may then populate the new records with the information (e.g., metadata attributes) stored in the child directories' inodes. The computer system may repeat the passing and aggregating of metadata attributes for each level until the inode for the root directory is populated with metadata attributes for all objects in the file system.

For example, the computer system may determine that the file system 300 has three levels of directories, with the third directory 308 being the only bottom level directory for the file system 300. The third directory may include two objects: object8 and object12. The computer system may perform a stat call of the third directory 308 to retrieve the stat details stored in the third inode 318 (e.g., the metadata attributes for object8 and object12). The computer system may then pass the information stored in the third inode 318 to the first directory 304, which is a second level directory and is the parent directory of the third directory 308. The computer system may then add the stat details from the third directory 308 to the inode for the first directory 304 (e.g., the first inode 314), which may already include metadata attributes for object1, which is stored in the first directory 304. In some embodiments, such as those where the inodes are being generated for the first time, the computer system may perform a stat call on the first directory 304 to identify the metadata attributes for object1. Likewise, the computer system may retrieve the stat details stored in the inode for the second directory 306 (e.g., the second inode 316), which is the other second level directory. Finally, the computer system may pass the stat details for all second level directories (e.g., the first and second directories 304 and 306) to their parent directory (e.g., the root directory 302), where the stat details for all objects in the file system 300 may be aggregated in the root inode 312.

In some embodiments, the computer system may only generate and populate extended directory inodes for some of the directories in the file system. For example, the computer system may generate an extended directory inode for the root directory 302, while all other directories may have traditional inodes that only store the stat details for objects nested directly within the associated directory. An advantage of these embodiments is that stat details may not be needlessly duplicated, lowering the amount of storage space needed for inodes. For example, a file system with seven directory levels will only store stat details for seventh level directories in inodes for the seventh level directories and in the root inode, instead of in all intermediary inodes. As another example, the stat details for object8 and object 12 in FIG. 3 may only be stored in the third inode 318 and the root inode 312, and not in the first inode 314. This may be particularly beneficial when the computer system is configured to search only the root directory inodes to identify, e.g., directories that need to be migrated according to an ILM policy.

Figure 4:
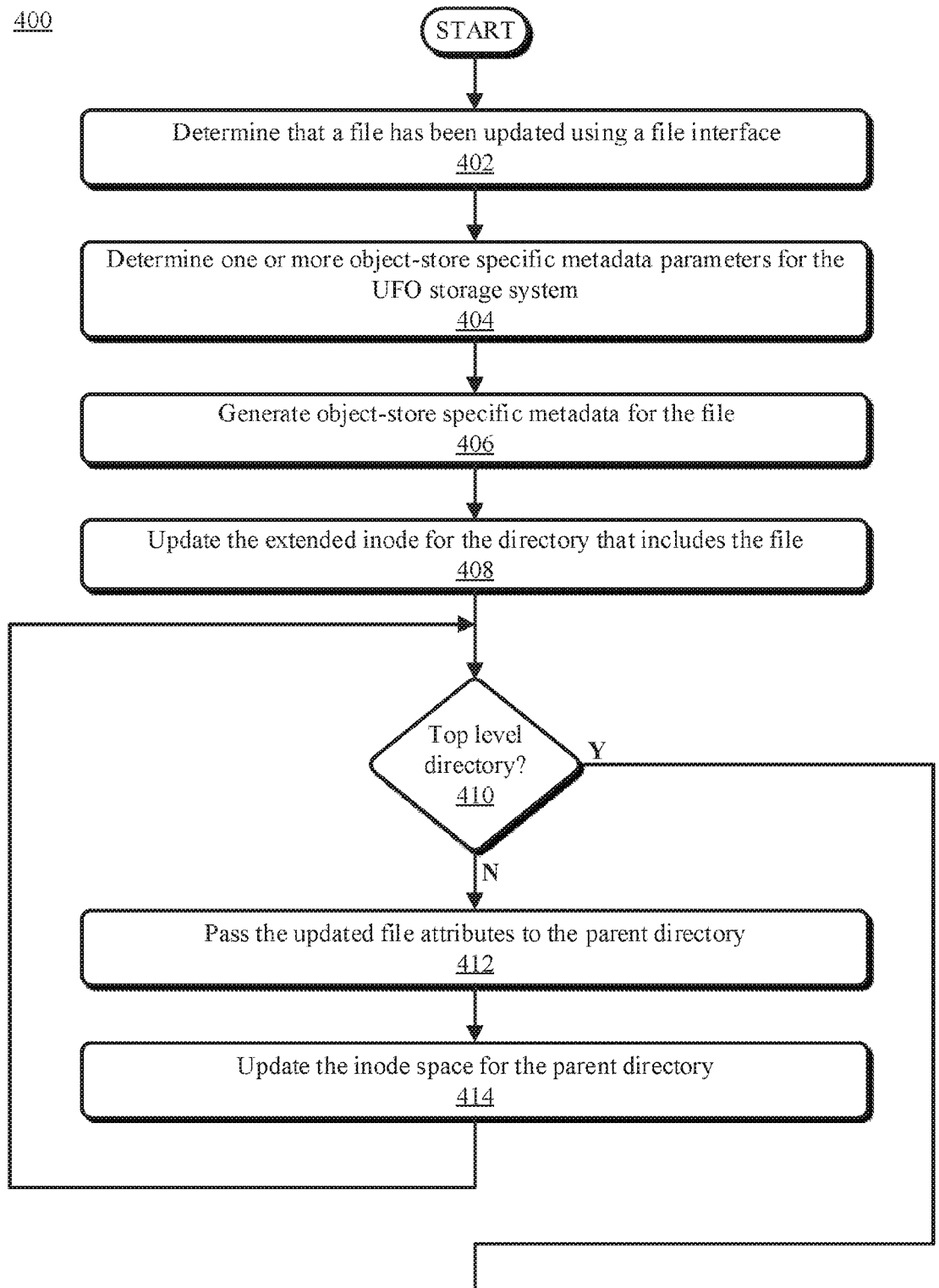
FIG. 4 illustrates a flowchart of an example method for generating object-store specific metadata for a file generated using a file system interface and updating extended directory inodes, in accordance with embodiments of the present disclosure.

Referring now to FIG. 4, shown is a flowchart of an example method 400 for generating object-store specific metadata for a file generated using a file system interface and for updating extended directory inodes, in accordance with embodiments of the present disclosure. The method 400 may be performed by a computer system (e.g., an object server or storage server). In some embodiments, one or more operations of the method 400 may be performed by a user, or by the computer system in response to user input. The method 400 may begin at operation 402, where the computer system may determine that a file has been updated using a file interface.

A file may be considered to have been updated if it is created, deleted, or modified in any way (including, in some embodiments, by being accessed). The computer system may use a file system event notification mechanism (e.g., Data Management API, general parallel file system (GPFS) Light Weight Events, inotify, etc.) to determine when a file has been updated using a file interface. For example, if the object is updated with using an NFS interface, the computer system may receive the "FILE UPDATE" notification from the file system event notification API, indicating that the file has been updated.

After determining that the file has been updated at operation 402, the computer system may determine one or more object-store specific metadata parameters that are used by the UFO storage system at operation 404. Object-store specific metadata parameters may include metadata parameters that the computer system generates whenever an object is created, but is not generated when a file is updated or generated using a file interface. For example, the object-store specific metadata parameters may include Content-Length, size, creation time, ETag, and/or other custom metadata details.

This metadata may be used by the object store internally to monitor for data corruption, perform a health check, etc. Additionally, the object-store specific metadata parameters may be used in conjunction with an ILM policy to determine where to store specific objects or directories, or in conjunction with ACL settings to manage access permissions for one or more groups of users. In some embodiments, the object-store specific metadata parameters may be user configurable. The user may change the object-store specific metadata parameters according to the specific needs of the user, or of the system that uses the data stored in the UFO storage system.

After determining one or more object-store specific metadata parameters used by the UFO system at operation 404, the computer system may generate object-store specific metadata for the file at operation 406. The object-store specific metadata may correspond to the metadata parameters identified at operation 404. For example, the computer system may generate metadata related to the content-length, size, or ETag for the file. In other words, the metadata parameters describe the type of metadata generated for an object or file (e.g., size, creation time), and the metadata attributes are the actual metadata values for an object (e.g., 1 GB, Feb. 2, 2015 at 2:31:42 PM).

After generating the object-store specific metadata for the file at operation 406, the computer system may update the extended inode for the directory that includes the file at operation 408. For example, if the file update identified at operation 402 is a modification to the file that affects the size of the file, the inode for the directory may be updated to include the new file size.

In some embodiments, updating the extended inode for the directory may include generating a new entry in the extended inode. For example, the file update may be the creation of a new file. Because the new file was recently created, it may not be included in the extended inode for the directory. Accordingly, the computer system may generate an entry for the new file in the inode and populate the fields of the inode with the metadata attributes of the file. In some embodiments, the metadata attributes in the inode may include only the object-store specific metadata. In other embodiments, the metadata stored in the inode may additionally include other metadata attributes for the file.

After updating the extended inode for the directory that includes the file at operation 408, the computer system may determine whether the directory is a top-level directory at decision block 410. If the computer system determines that the directory that stores the file is a top-level directory at decision block 410, the method 400 may end. If, however, the computer system determines that the directory that stores the file is not a top-level directory, the computer system may pass the updated file attributes to the parent directory at operation 412. Passing the updated file attributes to the parent directory may be performed as discussed in reference to operation 208 in FIG. 2.

After passing the updated file attributes to the parent directory at operation 412, the computer system may update the inode space for the parent directory at operation 414. As discussed in reference to operation 408, updating the inode may include simply updating specific metadata attributes (e.g., size), or it may include generating a new entry in the inode for the file (e.g., if the file was newly created). After updating the extended inode for the parent directory, the method 400 may return to decision block 410, where the computer system may determine whether the parent directory is a top-level directory. Operations 410 through 414 may be repeated until the updated metadata attributes for the file reaches the root directory, at which point the method 400 may end.

In some embodiments, the metadata attributes may also be stored in container and/or account databases or flat files.

The computer system may also update the container and/or account databases or flat files whenever a file is updated using a file interface.

Figure 5A:
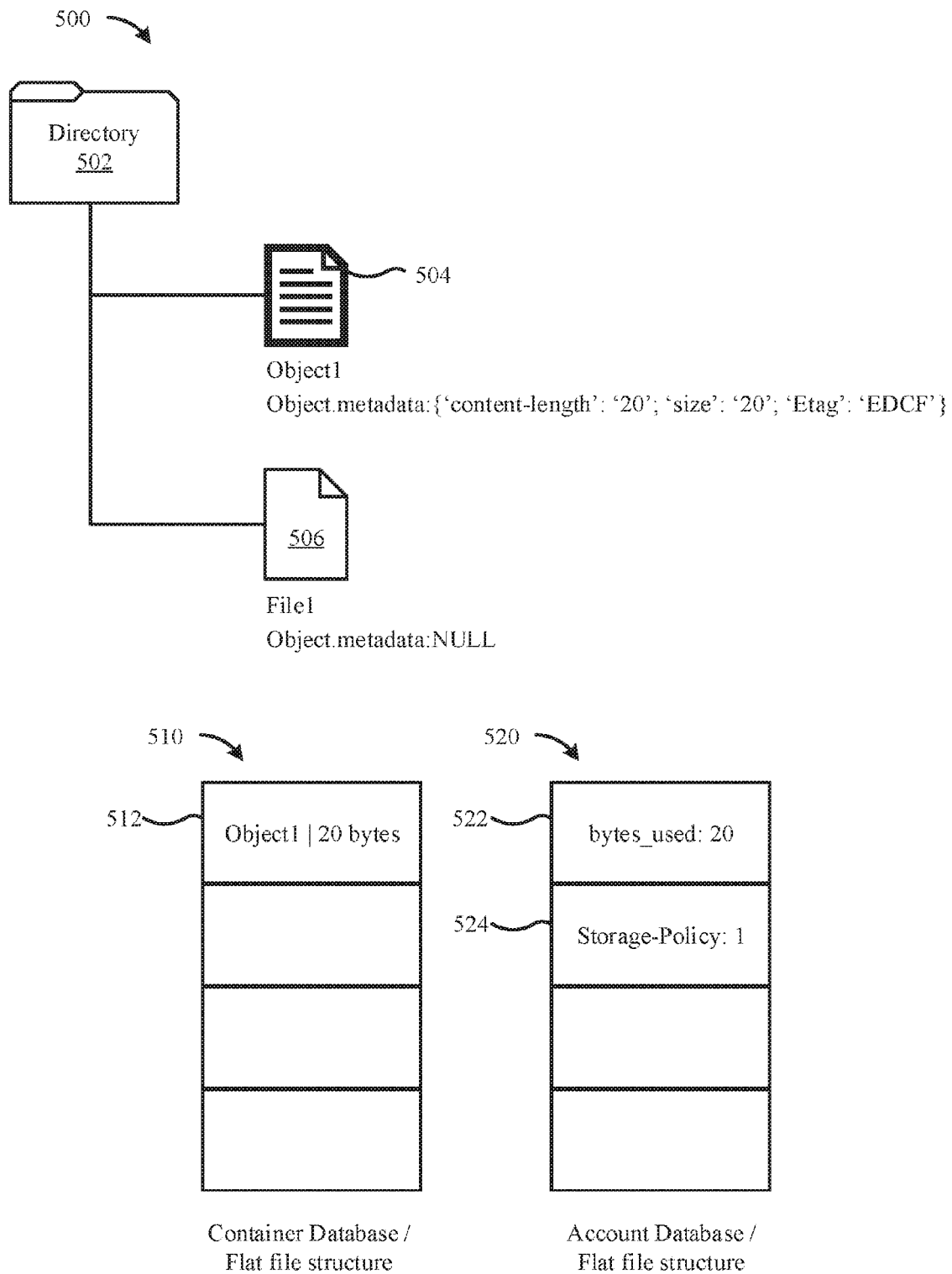
FIG. 5A illustrates an example unified file and object (UFO) namespace that includes a file created using a file system interface, in accordance with embodiments of the present disclosure.

Referring now to FIG. 5A, shown is an example of a traditional unified file and object (UFO) namespace 500 that includes a file 506 created using a file system interface, in accordance with embodiments of the present disclosure. The file 506 is stored along with an object 504 in a first directory 502. The object 504, which may have been generated using an object interface, includes a set of object-store specific metadata, shown as "Object.metadata" in the figure. Because the file 506 was generated using a file interface, it lacks any object-store specific metadata.

Also shown in FIG. 5A is a container database 510 for the first directory 502, and an account database 520. The container database 510 includes an entry 512 for the object 504. There is no entry for the file 506, however, because the file 506 was generated using a file interface and, therefore, was not added to the container database 510. Likewise, the account database 520, which stored metadata information for the container (also known as container statistics) such as total size 522 and storage policy 524, does not include any information regarding the file 506. For example, the total size of the container (e.g., the directory 602) is shown as being only 20 bytes, which is the size of the object 504 and does not include the file 506.

Figure 5B:
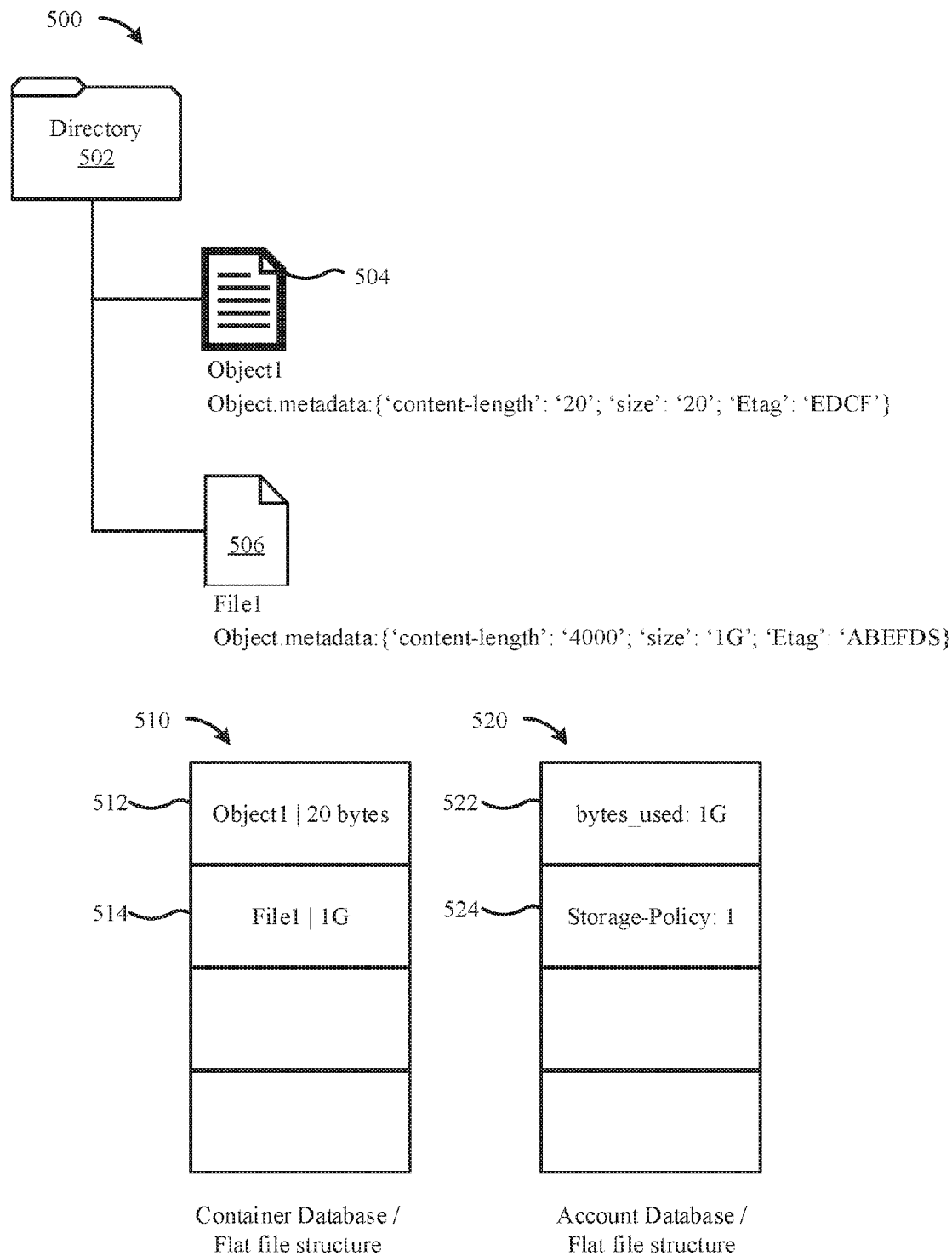
FIG. 5B illustrates the example UFO namespace of FIG. 5A after object-store specific metadata has been automatically generated for the file, in accordance with embodiments of the present disclosure.

Referring now to FIG. 5B, shown is the example UFO namespace 500 of FIG. 5A after object-store specific metadata has been automatically generated for the file, in accordance with embodiments of the present disclosure. The computer system may generate the object-store specific metadata after the file 506 is saved (e.g., after receiving a CLOSE call). The metadata attributes generated for the file 506 may be the same as those generated for objects (e.g., the object 504). After generating the object-store specific metadata for the file 506, the computer system may update the inode for the first directory 502, as well as the inodes for any parent directory or other upbranch directories.

In some embodiments, such as those where flat files and/or database are kept for archival or random access reasons, the computer system may also update a container database 510 and/or account database 520. As shown in FIG. 5B, the container database 510 may be updated to include an entry 514 for the file 506, in addition to the entry 512 for the object 504. Likewise, the account database 520 may be updated to include a new total size 522 for the container (e.g., for the directory 502). The storage policy 524 may be the same for the file 506 and the object 504, so the account database 520 may have the same storage policy 524 as before.

Figure 6:
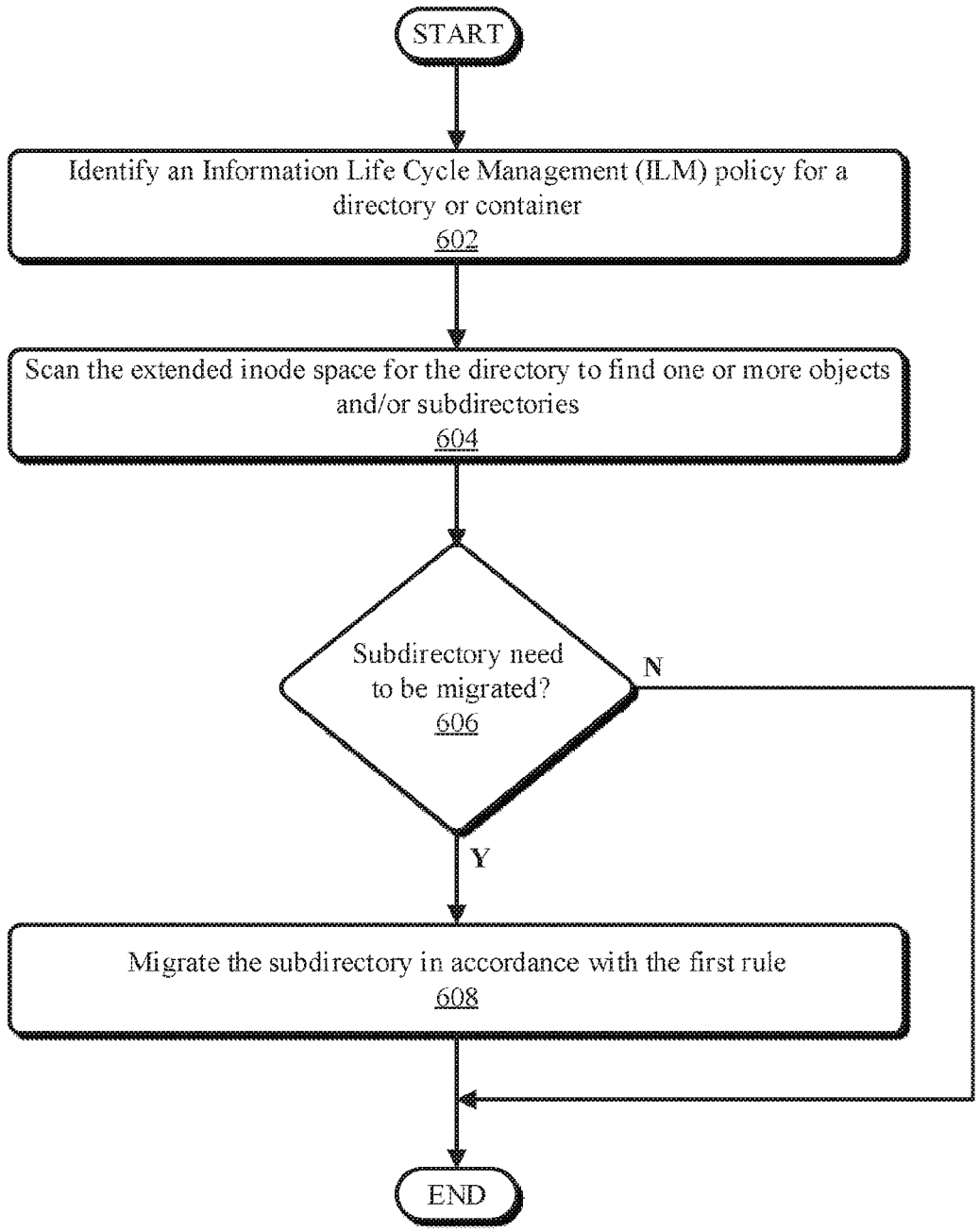
FIG. 6 illustrates a flowchart of an example method for determining whether to migrate one or more directories based on an Information Lifecycle Management (ILM) policy, in accordance with embodiments of the present disclosure.

Referring now to FIG. 6, shown is a flowchart of an example method 600 for determining whether to migrate one or more directories based on an Information Lifecycle Management (ILM) policy, in accordance with embodiments of the present disclosure. The method 600 may be performed by a computer system (e.g., an object server or storage server). In some embodiments, one or more operations of the method 600 may be performed by a user, or by the computer system in response to user input. The method 600 may begin at operation 602, where the computer system may identify an ILM policy for a directory or container.

The ILM policy may include one or more rules relating to the storage of objects and files in the UFO storage system. For example, the ILM policy may include rules related to data backup (e.g., how many copies of data are stored, where they are stored, etc.), disaster recovery (e.g., how to respond to the corruption of a file or object), archiving, and data replication. The ILM policy may also include rules related to which physical storage devices should store objects based on, for example, the size of the object or the sensitivity of the data. For example, the ILM policy may include a first rule. The first rule may indicate that objects that are larger than a threshold size (e.g., 512 Megabytes) should be stored in an SSD pool, while objects that are not larger than the threshold should be stored in a HDD pool.

After identifying the ILM policy for a directory or container at operation 602, the computer system may scan the extended inode for the directory to find one or more objects and/or subdirectories in the directory at operation 604. At decision block 606, the computer system may determine whether a subdirectory or object needs to be migrated. In order to determine whether to migrate a subdirectory, the computer system may compare metadata attributes for the objects and/or subdirectories to the one or more rules in the ILM policy. For example, the ILM policy may include the first rule described above. The computer system may scan the extended inode for the directory to identify which objects or subdirectories are larger than 512 Megabytes, and which are smaller. The computer system may also determine where the directory is currently stored (e.g., in what resource pool). If the computer system identifies an object that is larger than 512 Megabytes, and determines that the object is stored in a HDD pool, the computer system may determine that the subdirectory containing the object should be migrated to an SSD pool.

As another example, the extended inodes may include information regarding the sensitivity of the data. The ILM policy may have a rule that states that highly sensitive data (e.g., objects marked by a user as highly sensitive) must be stored in a particular pool of storage resources. This may be because, for example, the particular pool of storage resources are behind a firewall or are otherwise more secure than other storage resources in the UFO storage system. If the computer system determines that a highly sensitive object is currently stored in an unsecure (or insufficiently secure) storage device, the computer system may determine that the subdirectory with the object needs to be migrated.

If the computer system determines that no subdirectories (or objects) need to be migrated at decision block 606, the method 600 may end. If, however, the computer system determines that a subdirectory needs to be migrated at decision block 606, the computer system may migrate the subdirectory at operation 608 and the method 600 may end.

In some embodiments, migrating the subdirectory may include moving the subdirectory such that it has a new parent directory. In these embodiments, the computer system may update the extended inode for the old parent directory (and all other upbranch directories) as necessary. Likewise, the computer system may update the extended inode for the new parent directory, as well as for any new upbranch directories. The computer system may perform operations similar to operations 410 through 414 in FIG. 4 to update the extended inodes.

Figure 7:
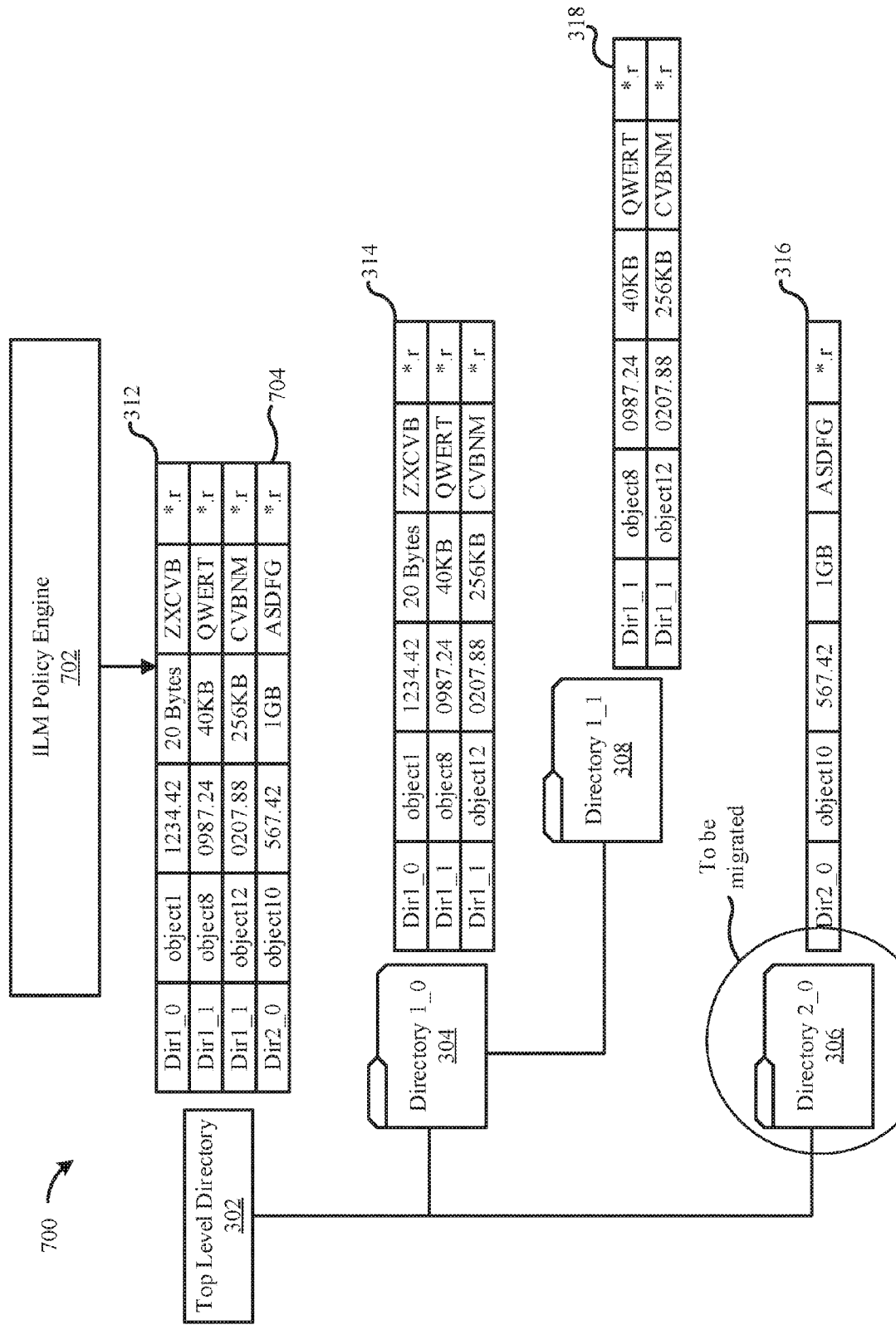
FIG. 7 illustrates an example of a UFO storage system that uses an ILM policy engine to perform the method of FIG. 6 to migrate a directory according to an ILM policy, in accordance with embodiments of the present disclosure.

Referring now to FIG. 7, shown is an example of a UFO storage system 700 that uses an ILM policy engine 702 to perform the method of FIG. 6 to migrate a directory according to an ILM policy, in accordance with embodiments of the present disclosure. The ILM policy engine 702 may have one or more policy rules. For example, an ILM rule may indicate that any directory that includes an object larger than 512 Megabytes should be migrated from a SATA HDD pool to an SSD pool, and anything that is less than 512 Megabytes should be stored in the SATA HDD pool.

The computer system may scan the inode 312 for the root directory 302 to identify one or more subdirectories that need to be migrated according to the ILM policy engine 702. The computer system may determine that object10, which is stored in the second directory 306, is 1 GB in size by determining that the fourth entry 704 in the root inode 312 is for a 1 GB object. Accordingly, the computer system may determine that the second directory 306 should be migrated to the SSD pool.

In some embodiments, each container (e.g., directory) may have different ILM policies with different ILM rules. For example, the first directory 304 may correspond to a first container that has an ILM rule that states that the threshold object size for migration to an SSD pool is 512 Megabytes, as discussed above. Meanwhile, the third directory 306, which may correspond to a second container, may have an ILM policy that states the threshold object size for migration to an SSD pool is 2 GB. In these embodiments, the computer system may scan the inodes for each container (e.g., the first inode 314 and the second inode 316) individually, instead of scanning the root inode 312. The computer system may then compare the objects or other entries in the first and second inodes 314 and 316 to their respective ILM policies to determine whether a directory should be migrated.

Referring now to FIG. 8, shown is a flowchart of an example method 800 for managing access control list (ACL) rules for a UFO storage system using extended directory inodes, in accordance with embodiments of the present disclosure. The method 800 may be performed by a computer system (e.g., an object server or storage server). In some embodiments, one or more operations of the method 800 may be performed by a user, or by the computer system in response to user input. The method 800 may begin at operation 802, where the computer system may generate one or more access control list (ACL) rules for an object stored in a first directory.

The ACL rules may establish permissions that indicate whether users, user groups, or system processes are able to access the object, the level of access each user, user group, or system process has to the object, as well as what operations are allowed to be performed on the object. The ACL rules may establish which users may read the file and which users may edit (e.g., write) the file. For example, the ACL rule for a file may indicate that all users connected to the file (e.g., that have mounted the file system with the file in it) have read access, but only a subset of users have write permission.

In some embodiments, the ACL rules may be initially set according to default rules. The default rules may be based on the container that includes the object (e.g., the directory rules). For example, in some embodiments all objects in a first directory may have a default rule that allows all users to read the object, but only the owner (e.g., creator) has write permission. In other embodiments, the default rules may be set by the user during creation of the object. For example, when the user saves a new object in the directory, the computer system may prompt the user to set ACL rules for the object. In some embodiments, the computer system may provide the creator with a list of users and/or user groups, and the user may select ACL rules for each user/user group.

After generating the ACL rules for the object at operation 802, the computer system may receive a notification that a user has changed the ACL rule for the object at operation 804. The computer system may receive a file system ACL change API request whenever the user attempts to change the ACL rule for the object. At decision block 806, the computer system may compare the newly received ACL rules (e.g., the new ACL template) to the old ACL rules to determine whether they differ. If the new ACL rules are the same as the old ACL rules, the method 800 may end. If, however, the new ACL rules are different, the computer system may prompt the user to approve the ACL change at operation 808.

In some embodiments, the computer system may prompt the user that requested the change to approve the change at operation 808. This may be done to ensure that the user is aware that the proposed ACL rules differ from the original ACL rules (e.g., differ from the default rules for the container). In other embodiments, the computer system may prompt a different user (e.g., an administrator or the owner of the object) to approve the change. In still other embodiments, the computer system may prompt both the user requesting the change and the owner/administrator.

If the computer system determines that the user (or all users, if multiple are prompted to accept the change) has not approved the change at decision block 812, the method 800 may end. Otherwise, the computer system may change the ACL rules for the object at operation 814. After changing the ACL rules for the object at operation 814, the computer system may update the extended inodes for the first directory and for all other upbranch directories at operation 816. The computer system may perform operations similar to operations 410 through 414 in FIG. 4 to update the extended inodes. After updating the extended inodes for the directory and all upbranch directories at operation 816, the method 800 may end.

Figure 9:
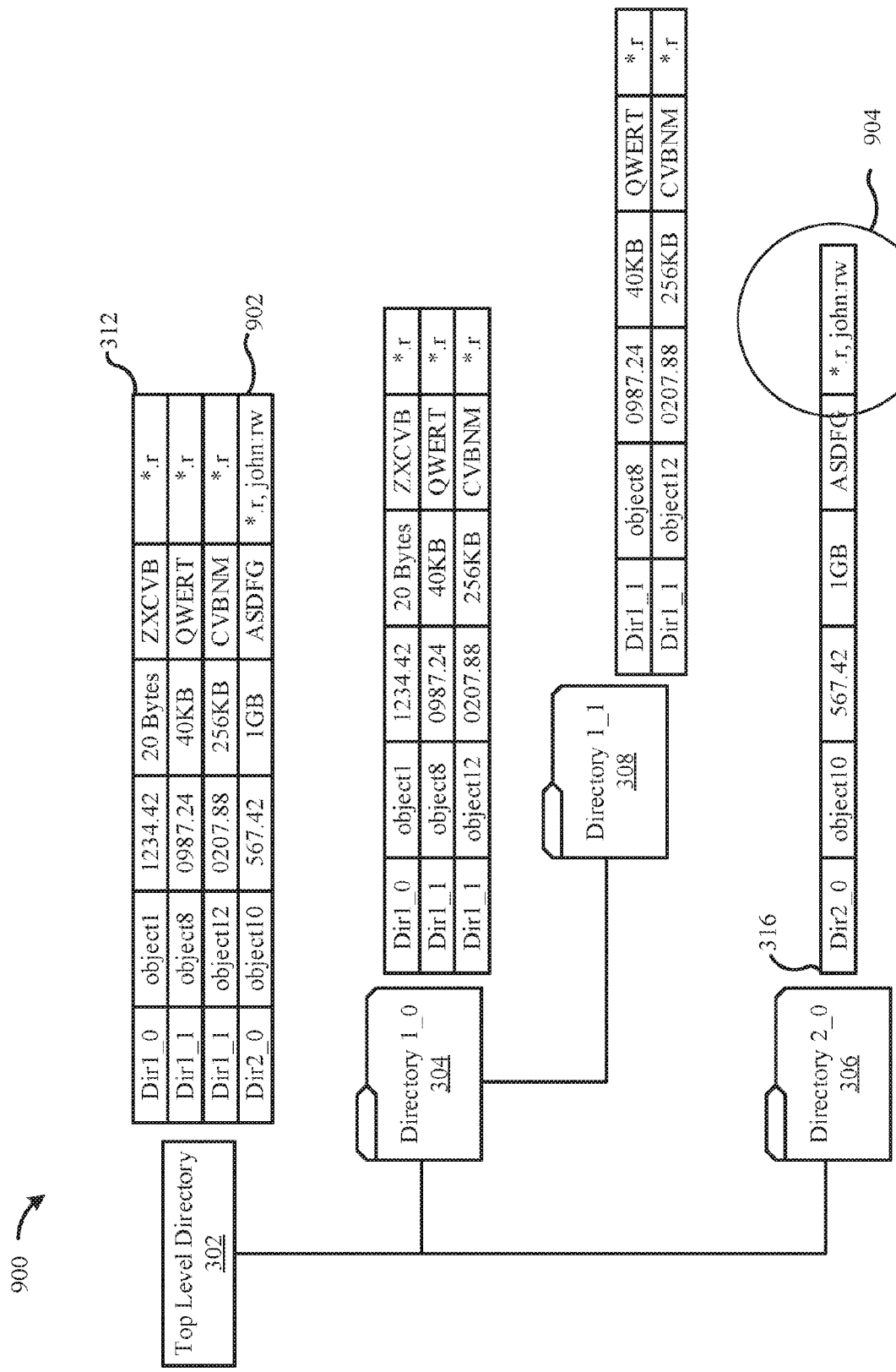
FIG. 9 illustrates an example of the extended directory inode for a top-level directory of FIG. 3 being changed in response to a user-approved ACL change to an object, in accordance with embodiments of the present disclosure.

Referring now to FIG. 9, shown is an example of the extended directory inode 900 for the top-level directory of FIG. 3 being changed in response to a user-approved ACL change to an object, in accordance with embodiments of the present disclosure. As shown in FIG. 3, the original ACL setting for object10 is "*.r," meaning that all users have read-only access to object10. After receiving the ACL change API request, the computer system may determine whether the new ACL rule matches the old ACL rule. If they do not match, the computer system may prompt the user to approve the change. For example, if a user changed the ACL setting for object10 to give user "John" read and write access, the computer system may prompt the user to confirm the change. If the user confirms the change, the inode 316 for the second directory 306 may be updated. For example, the second inode 316 may include a change 904 to the ACL permissions for object10. The changes may then be passed to higher level directories (e.g., to the root directory 302), and the inodes for the higher level directories may be updated accordingly. For example, the fourth entry 902 in the root inode 312 (corresponding to the root directory 302) may be updated to reflect the changed ACL permissions for object10.

Figure 10:
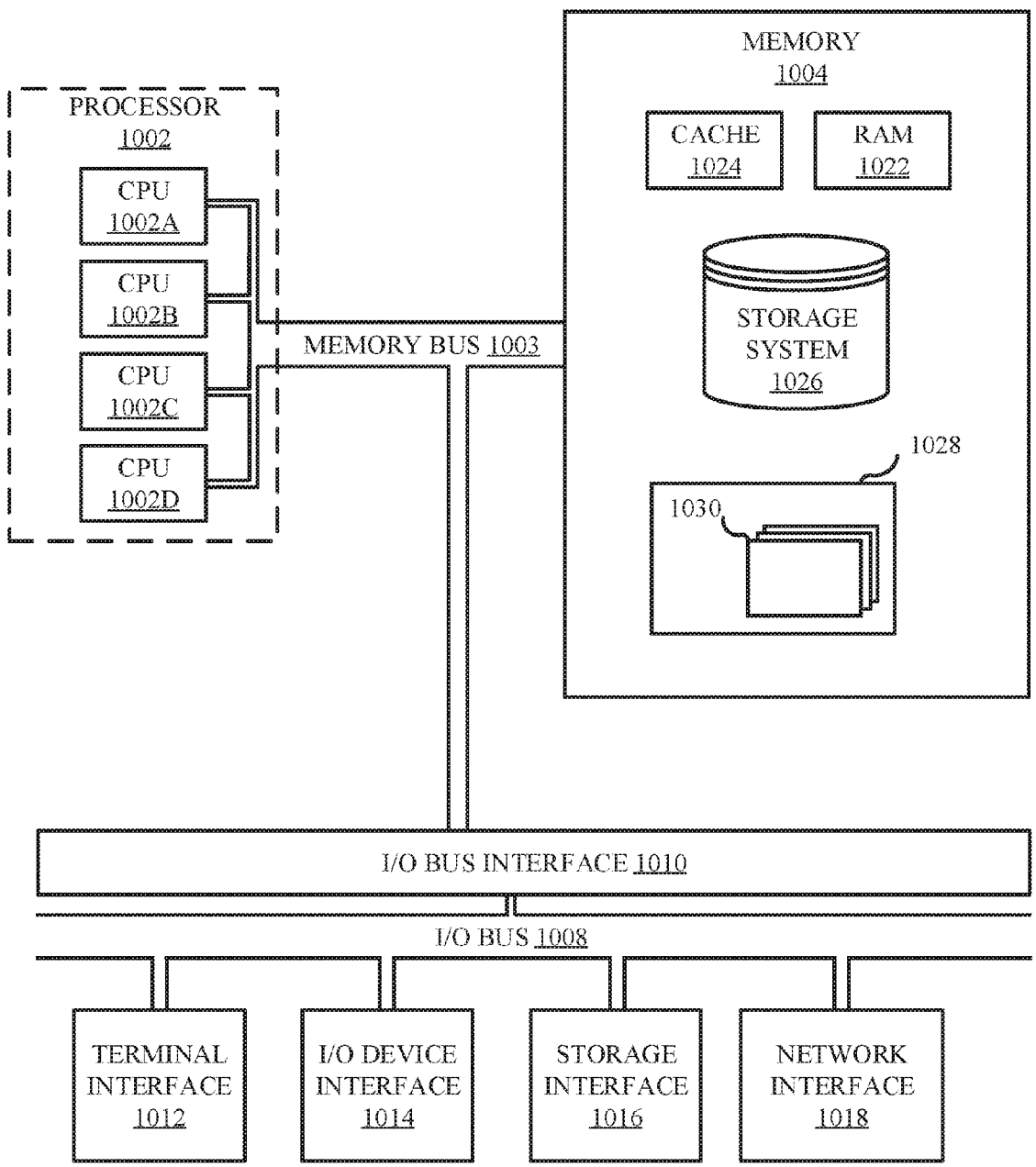
FIG. 10 illustrates a high-level block diagram of an example computer system that may be used in implementing one or more of the methods, tools, and modules, and any related functions, described herein, in accordance with embodiments of the present disclosure.

Referring now to FIG. 10, shown is a high-level block diagram of an example computer system 1001 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 may comprise one or more CPUs 1002, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030 may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer implemented method comprising:
   identifying, by a processor, a first directory in a unified file and object (UFO) storage system, the first directory having one or more subdirectories in one or more levels under the first directory, the one or more subdirectories including a second directory, the second directory having one or more objects, the first directory being associated with a first inode and the second directory being associated with a second inode;
   performing a stat call on the second directory to determine metadata attributes for the one or more objects, the metadata attributes for the one or more objects being stored in the second inode; and
   adding the metadata attributes for the one or more objects to the first inode.

2. The method of claim 1, the method further comprising:
   determining metadata attributes for a first object that is in the first directory; and
   populating the first inode with at least the metadata attributes for the first object.

3. The method of claim 2, the method further comprising:
   identifying one or more metadata parameters for objects in the UFO storage system, the UFO storage system having a UFO namespace where data can be accessed as an object and as a file, the one or more metadata parameters being parameters that are generated for objects stored in the UFO storage system;
   determining that a second object has been updated using a file storage interface;
   generating, by the processor and in response to determining that the second object has been updated using the file storage interface, metadata for the second object, the generated metadata including values for the one or more metadata parameters; and
   appending the metadata to the second object.

4. The method of claim 3, wherein the one or more metadata parameters are configurable by a user during a creation of the UFO namespace.

5. The method of claim 3, the method further comprising:
   identifying a third directory, the third directory being a directory in the file storage system that contains the second object;
   updating a third inode for the third directory, the third inode storing the metadata attributes for the second object, wherein the updating includes updating the metadata attributes of the second object;
   determining that the third directory is not a top-level directory;
   passing, in response to determining that the third directory is not the top-level directory, the metadata attributes for the second object to a fourth directory, the fourth directory being a parent directory of the third directory; and
   updating a fourth inode using the metadata attributes for the second object, the fourth inode being associated with the fourth directory.

6. The method of claim 3, the method further comprising:
   updating a first container database file, the first container database file storing a list of objects in a first container and associated object statistics for the objects in the first container, the objects in the first container including the second object; and
   updating a first account database file, the first account database file storing a list of one or more containers and associated container statistics for the one or more containers, the one or more containers including the first container.

7. The method of claim 2, the method further comprising:
   identifying, by an Information Lifecycle Management (ILM) policy engine, a first rule;
   determining, by analyzing the first inode using the first rule, that a second object in the UFO storage system being an object that needs to be migrated to a new storage device, wherein the second object is not in the first directory; and
   migrating the second object to the new storage device.

8. The method of claim 2, the method further comprising:
   determining that a user has modified an access control list setting for a second object that is stored in a third directory;
   comparing the modified access control list setting for the second object to a container access control list setting for a first container that includes the second object by analyzing an inode associated with the third directory; and
   determining whether the modified access control list setting for the second object matches the container access control list setting.

9. The method of claim 8, the method further comprising:
   notifying, in response to determining that the modified access control list setting for the second object does not match the container access control list setting, the user of the mismatch;
   prompting the user to approve the modified access control list setting for the second object; and
   updating, in response to the user approving the modified access control list setting, the inode associated with the third directory.

10. The method of claim 1, wherein the adding the metadata attributes for the one or more objects to the first inode comprises:
    determining that the first inode includes one or more entries;
    determining that the one or more entries do not include an entry for the one or more objects;
    generating a new entry in the first inode for each of the one or more objects; and
    populating each new entry with the metadata attributes for one of the one or more objects such that each of the one or more objects has an associated entry in the first inode.

11. The method of claim 1, wherein the metadata attributes include a creation time for each of the one or more objects, a size of each of the one or more objects, and owner and permission data for each of the one or more objects.

12. The method of claim 1, wherein the one or more objects includes a first object, the method further comprising:
    determining that the first object has been modified;
    determining updated metadata attributes for the first object;
    updating the second inode with the updated metadata attributes for the first object;
    passing the updated metadata attributes for the first object to the first directory; and updating the metadata attributes for the first object in the first inode.

13. The method of claim 1, wherein the metadata attributes for the one or more objects include a set of metadata attributes for each of the one or more objects, the set of metadata attributes for a respective object including values associated with the respective object for a plurality of metadata parameters.

14. The method of claim 1, wherein adding the metadata attributes for the one or more objects to the first inode includes storing, in the first inode, a complete copy of the metadata for each of the one or more objects.

15. The method of claim 14, wherein:
the metadata attributes for the one or more objects are stored in the first inode using a table,
the table includes a plurality of rows and columns,
each row corresponds to a different object,
each column corresponds to a particular metadata parameter, and
each data element in a respective row for a respective object includes a value associated with a metadata parameter that corresponds to a column of the data element.

16. A computer implemented method comprising:
identifying a root directory in a unified file and object (UFO) storage system that includes one or more subdirectories organized in one or more levels, the root directory and each of the one or more subdirectories having an associated inode that stores metadata, the one or more subdirectories including a leaf directory;
retrieving, from the inode for the leaf directory, metadata attributes for the leaf directory; and
storing the metadata attributes for the leaf directory in the inodes for each directory in a path between the root directory and the leaf directory.

17. The method of claim 16, wherein storing the metadata attributes for the leaf directory in the inodes for each directory in the path between the root directory and the leaf directory comprises:
passing the metadata attributes for the leaf directory to a first parent directory, the first parent directory being the parent directory of the leaf director;
storing the metadata attributes for the leaf directory in the inode for the first parent directory;
determining that the first parent directory is not the root directory;
determining metadata attributes for the first parent directory, the metadata attributes for the first parent directory including the metadata attributes for the leaf directory and metadata attributes of one or more objects stored in the first parent directory;
passing the metadata attributes for the first parent directory to a second parent directory, the second parent directory being the parent directory of the first parent directory; and
accumulating the metadata attributes for the leaf directory and the first parent directory in the inode for the second parent directory.

18. A system comprising:
a memory;
a processor in communication with the memory, the processor being configured to perform a method comprising:
identifying a first directory in a unified file and object (UFO) storage system, the first directory having one or more subdirectories in one or more levels under the first directory, the one or more subdirectories including a second directory, the second directory having one or more objects, the first directory being associated with a first inode and the second directory being associated with a second inode,
wherein the second inode includes metadata attributes for each of the one or more objects;
determining the metadata attributes for each of the one or more objects using the second inode; and
storing the metadata attributes for each of the one or more objects in the first inode.

19. The system of claim 18, wherein the method performed by the processor further comprises:
identifying one or more metadata parameters for objects in the UFO storage system, the UFO storage system having a UFO namespace where data can be accessed as an object and as a file, the one or more metadata parameters being parameters that are generated for objects stored in the UFO storage system;
determining that a second object has been updated using a file storage interface;
generating, by the processor and in response to determining that the second object has been updated using the file storage interface, metadata for the second object, the generated metadata including values for the one or more metadata parameters; and
appending the metadata to the second object.

20. The system of claim 18, wherein the one or more objects includes a first object, the method performed by the processor further comprising;
determining that the first object has been modified;
determining updated metadata attributes for the first object;
updating the second inode with the updated metadata attributes for the first object;
passing the updated metadata attributes for the first object to the first directory; and
updating the metadata attributes for the first object in the first inode.

21. The system of claim 18, wherein the method performed by the processor further comprises:
determining that a user has modified an access control list setting for a second object that is stored in a third directory;
comparing the modified access control list setting for the second object to a container access control list setting for a first container by analyzing an inode associated with the third directory, the first container including the second object;
determining whether the modified access control list setting for the second object matches the container access control list setting;
notifying, in response to determining that the modified access control list setting for the second object does not match the container access control list setting, the user of the mismatch;
prompting the user to approve the modified access control list setting for the second object; and
updating, in response to the user approving the modified access control list setting, the inode associated with the third directory.

22. A computer program product comprising a computer readable storage medium having program instructions embodied therewith, the program instructions executable by a processor to cause the processor to perform a method comprising:
identifying, by the processor, a first directory in a unified file and object (UFO) storage system having one or more subdirectories in one or more levels under the first directory, the one or more subdirectories including a second directory having one or more objects, the first directory being associated with a first inode and the second directory being associated with a second inode, wherein the second inode includes a set of metadata attributes for each of the one or more objects, the set of metadata attributes for a respective object including values associated with the respective object for a plurality of metadata parameters;

retrieving the set of metadata attributes for the one or more objects from the second inode; and adding the set of metadata attributes for the one or more objects to the first inode.

23. The computer program product of claim 22, wherein the method performed by the processor further comprises:

identifying one or more metadata parameters for objects in the UFO storage system, the UFO storage system having a UFO namespace where data can be accessed as an object and as a file, the one or more metadata parameters being parameters that are generated for objects stored in the UFO storage system;

determining that a second object has been updated using a file storage interface;

generating, by the processor and in response to determining that the second object has been updated using the file storage interface, metadata for the second object, the generated metadata including values for the one or more metadata parameters; and appending the metadata to the second object.

24. The computer program product of claim 22, wherein the one or more objects includes a first object, the method performed by the processor further comprising;

determining that the first object has been modified;

determining updated metadata attributes for the first object;

updating the second inode with the updated metadata attributes for the first object;

passing the updated metadata attributes for the first object to the first directory; and updating the metadata attributes for the first object in the first inode.

25. The computer program product of claim 22, wherein the method performed by the processor further comprises:

determining that a user has modified an access control list setting for a second object that is stored in a third directory;

comparing the modified access control list setting for the second object to a container access control list setting for a first container by analyzing an inode associated with the third directory, the first container including the second object;

determining whether the modified access control list setting for the second object matches the container access control list setting;

notifying, in response to determining that the modified access control list setting for the second object does not match the container access control list setting, the user of the mismatch;

prompting the user to approve the modified access control list setting for the second object; and updating, in response to the user approving the modified access control list setting, the inode associated with the third directory.

* * * * *